US012412550B1

(12) United States Patent
Murski

(10) Patent No.: US 12,412,550 B1
(45) Date of Patent: Sep. 9, 2025

(54) DRUM SET TRANSPORTATION APPARATUS AND METHOD OF USE

(71) Applicant: Paul John Murski, Brenham, TX (US)

(72) Inventor: Paul John Murski, Brenham, TX (US)

(*) Notice: Subject to any disclaimer, the term of this patent is extended or adjusted under 35 U.S.C. 154(b) by 0 days.

(21) Appl. No.: 18/808,384

(22) Filed: Aug. 19, 2024

(51) Int. Cl.
*G10D 13/10* (2020.01)
*G10G 7/00* (2006.01)

(52) U.S. Cl.
CPC ............ *G10D 13/28* (2020.02); *G10G 7/005* (2013.01)

(58) Field of Classification Search
CPC ............ G10D 13/28; G10G 7/005
USPC ............ 84/412
See application file for complete search history.

(56) References Cited

U.S. PATENT DOCUMENTS 3,188,046 A * 6/1965 Cervenka ............ F16B 9/054 403/197
3,326,074 A * 6/1967 Osty ............ G10D 13/03 84/411 R
D253,229 S * 10/1979 Spranger ............ D34/19
4,333,682 A * 6/1982 Iser ............ A47C 9/08 190/8
4,579,229 A 4/1986 Porcaro
4,593,596 A 6/1986 Gauger
5,240,264 A * 8/1993 Williams ............ B62B 3/006 280/654
5,464,236 A * 11/1995 Benting ............ B62B 3/02 280/30
6,550,860 B2 * 4/2003 Lombardi ............ A47C 13/00 297/188.09
6,610,916 B1 8/2003 Torrez
7,608,769 B2 * 10/2009 Izen ............ G10D 13/02 84/411 R
8,657,129 B2 2/2014 Marks
9,601,099 B2 * 3/2017 Steele ............ G10H 1/32
9,754,567 B1 * 9/2017 Griffin ............ G10D 13/02
9,792,887 B2 * 10/2017 Pinelli ............ G10D 13/02
9,884,638 B1 * 2/2018 Sulcer, Jr. ............ B62B 1/18
10,013,960 B1 * 7/2018 Wish ............ G10D 13/11
10,783,861 B2 * 9/2020 Fowler ............ G10D 13/02
10,822,194 B1 * 11/2020 Hegler ............ B65H 75/4402
11,862,130 B2 * 1/2024 Murthy ............ G10D 13/28
2005/0252358 A1 * 11/2005 Izen ............ G10D 13/02 84/411 R
2010/0043622 A1 * 2/2010 Sandson ............ G10D 13/28 84/411 R (Continued)

FOREIGN PATENT DOCUMENTS

AU 2005203236 A1 * 2/2007 ............ G10D 13/10
ES 2933183 T3 * 2/2023 ............ G10D 13/06

(Continued)

*Primary Examiner* — Christina M Schreiber

(57) ABSTRACT

A drum set transportation apparatus is provided that includes a cover and a frame adapted to hold a kick drum and additional drum components. The cover contains a set of wheels and a handle and is removably attached to the frame so that a user may place the cover over the frame and transport the kick drum and additional components with ease. The frame has a plurality of attachment points that allow for a user to attach additional instrument components such as instruments stands. The apparatus further contains padded inserts to protect the enclosed instruments during transportation and the padded inserts may include features to allow for storage of other components such as drumsticks.

20 Claims, 6 Drawing Sheets

(56) References Cited

U.S. PATENT DOCUMENTS

| | | | | |
|---|---|---|---|---|
| 2010/0051488 | A1* | 3/2010 | Allen | A45C 13/26 206/314 |
| 2020/0105233 | A1* | 4/2020 | Savona | G10D 13/11 |
| 2021/0158787 | A1* | 5/2021 | Wish | G10D 13/28 |
| 2021/0241727 | A1* | 8/2021 | Wish | G10D 13/02 |
| 2023/0386434 | A1* | 11/2023 | Wish | F16M 13/022 |
| 2023/0395043 | A1* | 12/2023 | Wish | G10D 13/11 |

FOREIGN PATENT DOCUMENTS

| | | | | |
|---|---|---|---|---|
| JP | 2017509934 | A * | 4/2017 | G10D 13/02 |
| WO | WO-2015144461 | A1 * | 10/2015 | G10D 13/02 |

* cited by examiner

DRUM SET TRANSPORTATION APPARATUS AND METHOD OF USE

BACKGROUND

In order for a drummer to play its instruments, the drummer must first utilize a large amount of hardware to set up and support those instruments. As an example, there may be as many as five to ten separate stands that support the individual instruments that make up a drum kit-all of which must be set up prior to playing. Additionally, when the drummer is done playing, the drummer must reverse the process and break down the hardware that was laboriously set up. Thus, this large amount of hardware presents a labor-intensive problem for drummers that frequently set up and tear down their drum kit. Although there have been attempts to reduce the amount of hardware (and time) required to set up a drummer's instruments-by providing a frame configured to quickly receive portions of a drum kit's existing hardware—these solutions still require the drummer to store the additional instrument hardware separately prior to transportation. As a result, these solutions do not reduce the amount of hardware required, nor do they save a significant amount of set-up or tear-down time. In all of the aforementioned solutions, the large amount of hardware can easily become disorganized. Finally, traditional means for the storage and transportation of drums kits—e.g., cardboard boxes or hard-shell carrying cases-require a drummer to either carry their drum kit's heavy and unwieldy stands or bring another piece of equipment to aid in their transportation. As exhibited by the foregoing limitations of existing transportation solutions, the set-up and tear-down processes for a drummer's instruments continue to be lengthy and labor-intensive.

For the forgoing reasons, there is a need for a device that facilitates the transportation and rapid assembly of a drum set by storing and transporting the kick drum and hardware together as one piece to which the other instruments can be attached as needed.

SUMMARY

The present application is directed towards an apparatus that stores and transports a kick drum together with the hardware necessary for a drum kit, as one piece, which substantially reduces the time and effort required to transport and set up a drum kit.

In some embodiments, the apparatus includes a frame, where the frame includes a base with a first base rail and a second base rail, the first and second base rails connected by a horizontal base rail, a first upright and second upright connected to the first base rail and a third upright and fourth upright connected to the second base rail, a first top rail connected to the first upright and second upright, a second top rail connected to the third uptight and fourth upright, a plurality of instrument stands removably attached to the frame and a rectangular cuboid cover with an open face adapted to overlay the frame at least two handles disposed on a pair of opposite faces of the cover and at least two wheels mounted to the cover, the wheels mounted on opposite faces of the cover and disposed near the open face of the cover.

In some embodiments, the first base rail is connected to a first anterior horizontal member and the second base rail is connected to a second anterior horizontal member. In some embodiments, the frame includes a solid bottom face connected to the first base rail on one edge and the second base rail at an opposite edge. In some embodiments, the first and second anterior horizontal members are disposed inline and a space separating the first and second anterior horizontal members is adapted to fit a kick drum pedal.

In some embodiments, the top rails include at least one longitudinally extending opening which is configured to receive fasteners. In some embodiments, the base rails include longitudinally extending openings configured to receive fasteners. In some embodiments, the frame includes at least two turnbuckles affixed to the base rails and used to mount a kick drum to the frame. In some embodiments, the frame includes a first and second cylindrical members which are attached to the anterior horizontal members and the horizontal member. The cylindrical members are spaced to support a kick drum.

In some embodiments, instrument stands are attached to the top and bottom rails and secured by fasteners which attach to the longitudinal openings. In some embodiments, the instrument stands are hollow posts and are configured to receive additional instrument elements. In some embodiments, a padded insert is included with the apparatus. The padded insert may be shaped to protect a kick drum. In some embodiments the padded insert contains cavities to hold instrument elements.

In some embodiments the cover includes a padded layer on an upper interior surface of the cover. In some embodiments, non-slip pads are attached to the bottom of the solid bottom face. In some embodiments, the non-slip padas have adjustable mounts that may be used to adjust the height of the frame.

In another aspect of this disclosure, an instrument transportation apparatus is disclosed and includes a rectangular cuboid frame. The frame includes top rails and bottom rials, connected by uprights. The bottom rails are connected by a horizontal rail. The frame is configured to hold an article. The transportation apparatus includes a cover which is configured to fit around the frame, the cover having an open bottom face. Wheels are disposed in parallel along the bottom of the cover, and a retractable handle is disposed at the top of the cover. The apparatus includes accessory connection poles and the accessory connection poles are configured to attach to the frame and a set of secondary articles. In some embodiments the frame has at least two turnbuckles attached to the bottom rails and configured to secure the article. In some embodiments, the frame includes non-stick pads on the bottom.

In another aspect of the disclosure a method for using a drum set transportation apparatus is described. The method includes setting down the drum set transportation apparatus, unlatching a set of retaining latches that are affixed to the cover of the apparatus, lifting the cover, removing a padded insert, attaching instrument poles, adjusting the height of the drum set transportation apparatus, and placing a kick drum placing a kick drum pedal in an opening on the frame of the transportation apparatus.

BRIEF DESCRIPTION OF THE DRAWINGS

These and other features, aspects, and advantages of the present invention will become better understood with regard to the following description, appended claims, and accompanying drawings where:

DETAILED DESCRIPTION

The embodiments of the invention described herein are not intended to be exhaustive or to limit the invention to the precise forms disclosed. Rather, the embodiments selected for description have been chosen to enable one skilled in the art to practice the invention.

Referring to FIGS. 1-6, various examples of a drum set transportation apparatus are depicted. Drum set transportation apparatus 100 is designed to reduce the time and labor required to transport and set up a drum set by storing a kick drum and necessary hardware together.

Figure 1:
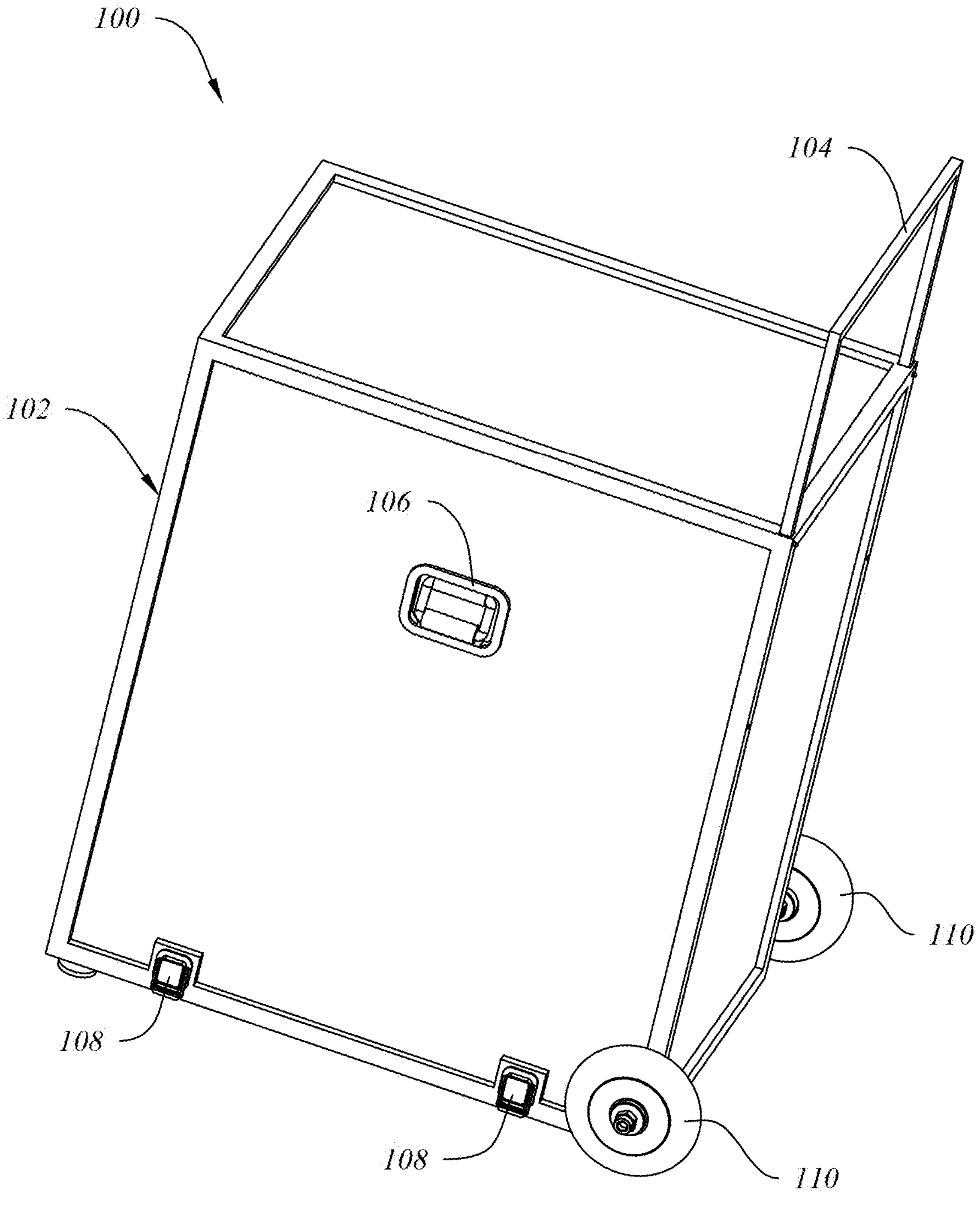
FIG. 1 illustrates an embodiment of a drum set transportation apparatus that depicts the outside of a cover in accordance with one aspect of this specification.

As shown in FIG. 1, drum set transportation apparatus 100 includes cover 102. As shown, cover 102 includes a pair of wheels 110, protruding handle 104, recessed handles 106, and a plurality of retaining latches 108. In some embodiments, there may be more or fewer retaining latches. As shown in FIG. 1, cover 102 is in the shape of a rectangular cuboid without a lower face, although other shapes may be possible, such as a cuboid with uneven sides. Cover 102 may be comprised of a material strong enough to resist deformation during transportation. As an example, cover 102 may be comprised of fiberglass or another material such as plastic or carbon fiber.

As depicted in FIG. 1, wheels 110 are disposed on opposing sides along a lower edge of cover 102. In some embodiments, wheels 110 may be removable. In some embodiments, handle 104 may be disposed along a top of one edge of cover 102. Handle 104 may be extendable and retractable by means of one or more telescoping members. In some embodiments, a plurality of retaining latches 108 are disposed along lower edges of at least two opposing sides of cover 102. Retaining latches are configured to attach to protrusions of a frame designed to sit inside of cover 102 as further depicted in FIG. 2.

Referring still to FIG. 1, with the cover attached to an enclosed frame, using a force applied downward and backward on protruding handle 104, the user can tilt drum set transportation apparatus 100 backward such that drum set transportation apparatus 100 pivots about the axis formed by wheels 110. In this tilted position, the user can exert a pulling or pushing force on protruding handle 104, leveraging the rotational movement of wheels 110 to transport drum set transportation apparatus 100.

Figure 2:
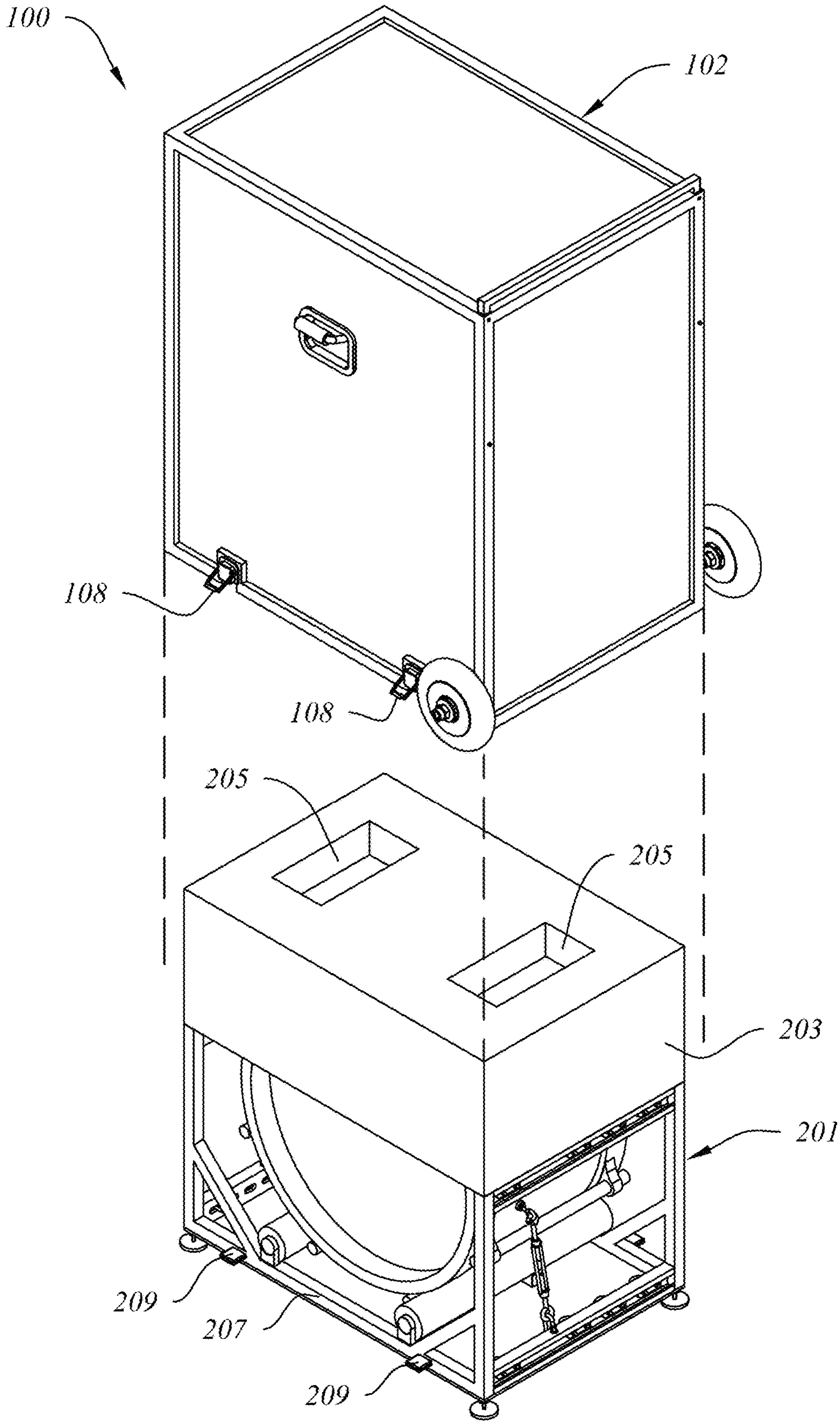
FIG. 2 illustrates an embodiment of a drum set transportation apparatus that depicts the removal of a cover and a padded insert on a frame in accordance with one aspect of this specification.

As shown in FIG. 2, cover 102 may be configured to fit over and enclose frame 201, where frame 201 may be further specifically adapted to hold an instrument. Cover 102 may comprise a plurality of retaining latches 108 adapted to secure cover 102 to frame 201 when the latches are engaged. Frame 201 may have a plurality of retaining latch catches 209 disposed along at least one lower edge to receive and secure retaining latches 108. Other latching configurations may be possible.

As further shown in FIG. 2, drum set transportation apparatus 100 may further comprise at least one padded insert 203 adapted to fit over an upper surface of frame 201. In some embodiments, padded insert 203 is removeable. In alternative embodiments, padded insert 203 may be affixed to the inside of cover 102 such that when cover 102 is removed, padded insert 203 is also removed, exposing the complete contents of the enclosed frame and instruments. Padded insert 203 may be made of a soft material that may deform temporarily under impact. As an example, padded insert 203 may be made of packing foam. In some embodiments, the packing foam may be polyethylene foam. Padded insert 203 may have a minimum thickness between 0.25 inches and 3 inches, although in some areas padded insert may be thicker to fill otherwise empty space within the enclosure.

Padded insert 203 may include one or more cavities 205 on its upper surface. Cavities 205 may be rectangular in shape with a length of between 1 inch and 30 inches, a width of between 1 inch and 30 inches, and a depth of between 1 inch and 4 inches. In this manner cavities 205 may act to store various drum kit accessories. Cavities 205 may be suitably shaped and sized to hold various accessories for a drum kit, or for drum set transportation apparatus 100.

Figure 3:
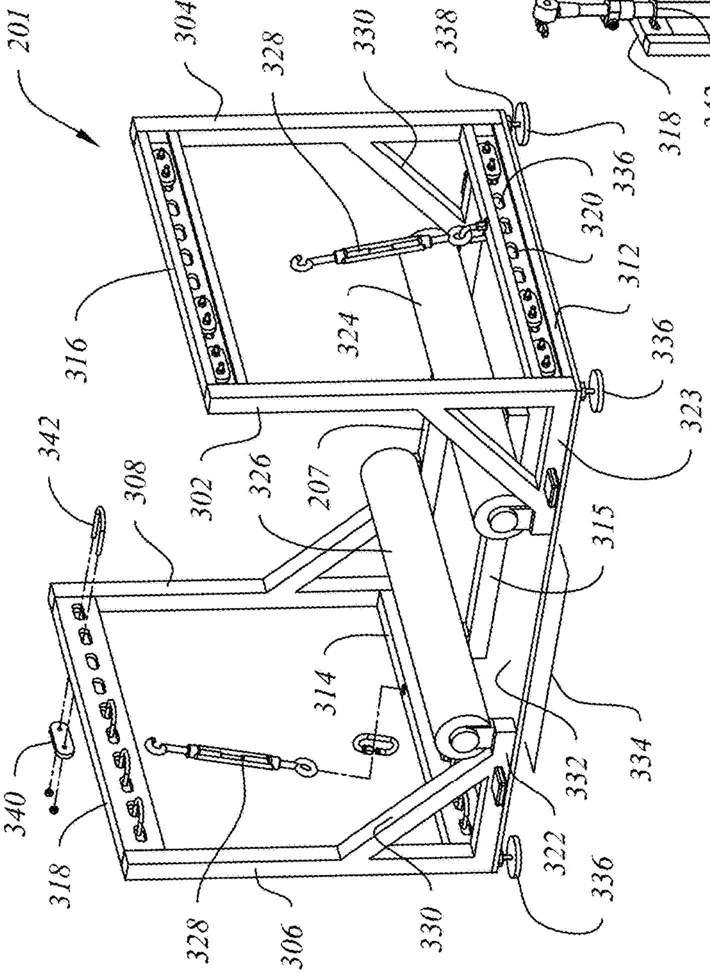
FIG. 3 illustrates an embodiment of a drum set transportation apparatus that depicts a frame in accordance with one aspect of this specification.

As shown in FIG. 3, drum set transportation apparatus 300 includes frame 201. Frame 201 comprises base frame elements made up of first base rail 312, second base rail 314, anterior member 322, anterior member 323, and posterior member 207 coupled together. Frame 201 further comprises first upright 302 at the connection point between first base rail 312 and anterior members 322 and 323, second upright 304 at the connection point between first base rail 312 and posterior member 207, third upright 306 at the connection point between the second base rail 314 and anterior member 322, and fourth upright 308 at the connection point between second base rail 314 and posterior member 207. In alternative embodiments (not shown), uprights 302, 304, 306, and 308 may be offset from the connection points of the base rails with the anterior and posterior members. As shown, first upright 302 and second upright 304 are connected by first top rail 316, and third upright 306 and fourth upright 308 are connected by second top rail 318. Frame 201 may further comprise turnbuckles 328, each affixed to one of the first and second base rails 312 and 314. Frame 201 may be comprised of aluminum or another material of sufficient strength and rigidity to resist deformation during transportation and use. Frame 201 may also be comprised of carbon fiber.

In some embodiments, uprights 302, 304, 306, and 308 may be coupled to the base utilizing a plurality of bracing members 330. The plurality of bracing members 330 may be utilized to support structural integrity of the frame by attaching upright members to horizontal components.

In some embodiments, dimensions of frame 201 may be approximately 28 inches in width, 21 inches in depth, and 16 inches in height. However, in other embodiments, the dimensions of frame 201 may vary to accommodate differently sized instruments or varying amounts of hardware. For example, the dimensions of frame 201 may have a width between 16 and 36 inches, a depth between 4 and 26 inches, and a height between 6 and 36 inches.

As depicted, frame 201 includes opening 334 between anterior members 322 and 323 substantially spaced to accommodate a kick drum pedal. In some embodiments, anterior members 322 and 323 may be connected and may not have opening 334. In some embodiments, the dimensions of opening 334 may be approximately 11 inches in width. As shown in FIG. 3, center member 315 is disposed behind opening 334 to allow sufficient space for placement of the kick drum pedal or other apparatus. As depicted, center member 315 is approximately 12 inches behind opening 334, however in alternative embodiments, the distance between center member 315 and opening 334 may vary to accommodate appropriate instruments.

In some embodiments, frame 201 may further comprise a solid floor 332. Solid floor 332 may be comprised of a material of sufficient strength and rigidity to resist deformation during transportation and use. In some embodiments, solid floor 332 may be comprised of aluminum. In other embodiments, solid floor 332 may be comprised of fiberglass.

As shown, frame 201 includes a plurality of longitudinally extending openings 320 disposed along first base rail 312, second base rail 314, first top rail 316 and second top rail 318. While a plurality of openings are shown, fewer openings may be utilized. The longitudinally extending openings 320 may be used in conjunction with a plurality of U-bolts 342, and a plurality of securing plates 340 to attach additional drum hardware elements. Alternative hardware known to those in the art may be used for attaching other drum hardware elements.

In some embodiments, the lower face of frame 201 may comprise a plurality of non-slip pads 336 attached on the lower face of the first base rail 312 and second base rail 314. Non-slip pads 336 may be comprised of a non-rigid material. In some embodiments, non-slip pads 336 may be comprised of hard rubber. Non-slip pads 336 may have a height of between 0.125 inches and 2 inches. Plurality of non-slip pads 336 may be attached to the solid floor 332 by a plurality of adjustable mounts 338 configured to allow the pads to be disposed at varying distances from the lower face of the solid floor 332. As an example, adjustable mounts 338 may comprise a screw that may be extended from or retracted into the base or a portion of one of the uprights by rotating-thereby allowing non-slip pads 336 to be disposed at varying distances from the lower face of frame 201.

In some embodiments, frame 201 further includes a first cylinder 324 and a second cylinder 326. First cylinder 324 may be connected at one end to the anterior member 322 and at the opposite end to the posterior member 207. Second cylinder 326 may be connected at one end to the anterior member 323 and at the opposite end to the posterior member 207. First cylinder 324 and second cylinder 326 may be connected at their midpoints by a center member 315.

Figure 4:
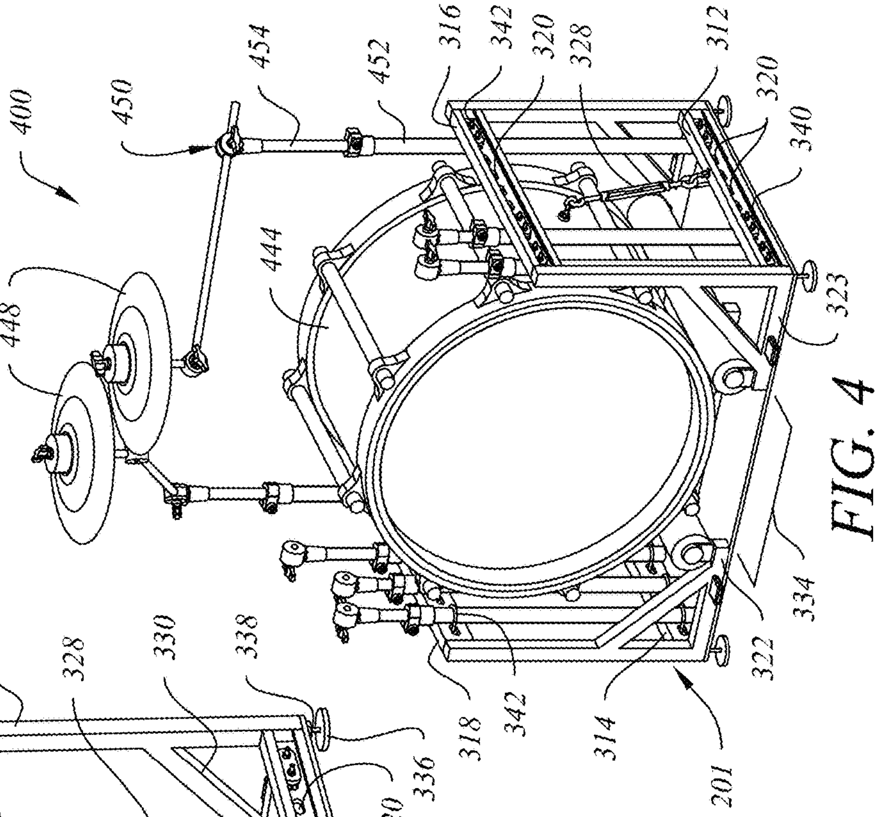
FIG. 4 illustrates an embodiment of a drum set transportation apparatus that depicts a frame with a kick drum and instrument stands in accordance with one aspect of this specification.

As shown in FIG. 4, drum set transportation apparatus 400 includes frame 201 which is configured to support kick drum 444 in place under tension by use of at least two turnbuckles 328. Drum set transportation apparatus 400 further includes kick drum 444, high hats 448, or other secondary articles, etc. In alternative embodiments, not shown, drum set transportation apparatus 400 may be configured to hold other instruments, including, for example, slide guitar, keyboard, xylophone, or any other similar structures, components, or technologies that would be understood by one skilled in the art.

As depicted in FIG. 4, anterior members 322 and 323 do not connect, however in other embodiments (not shown), anterior members 322 and 323 may connect inline. As depicted, opening 334 is disposed between anterior members 322 and 323. Opening 334 may provide access to one or more latches (not shown) that allow kick drum 444 to be removably attached to frame 201.

As further shown in FIG. 4, drum set transportation apparatus 400 may comprise a plurality of adjustable instrument stands 450 that may be removably attached to frame 201 via the longitudinally extending openings 320 within the first base rail 312, second base rail 314, first top rail 316, and second top rail 318. Adjustable instrument stands 446 may be accessory connection poles or may comprise a removable hollow post structure 452 and a vertical rod 454. Vertical rod 454 of adjustable instrument stands 450 may sit within the removable hollow post structure 452. Adjustable instrument stands 450 may be fastened to frame 201 by U-bolts 342 and securing plates 340 disposed through the longitudinally extending openings 320 in the first base rail 312, second base rail 314, first top rail 316, and second top rail 318.

Figure 5:
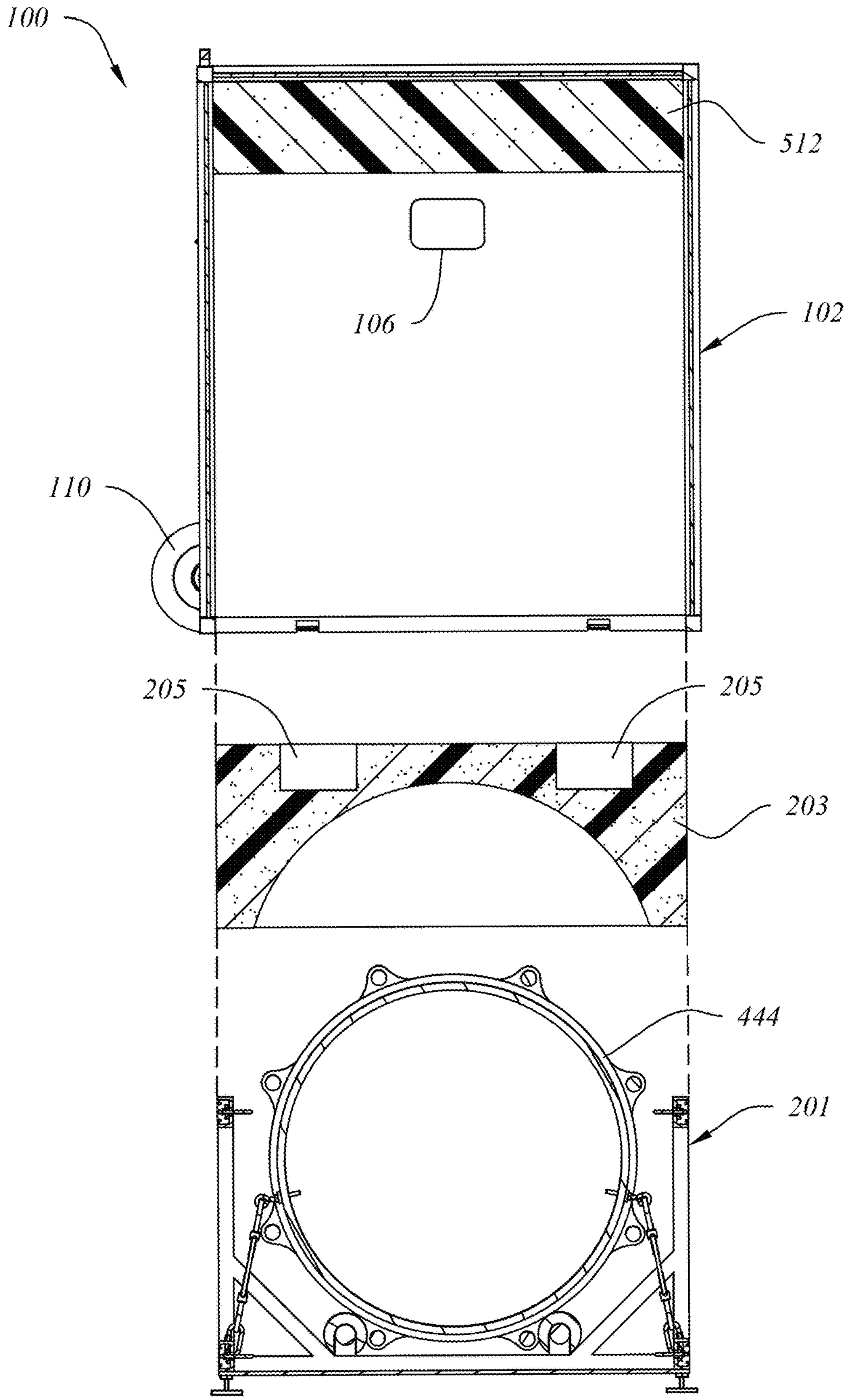
FIG. 5 illustrates an embodiment of a drum set transportation apparatus that depicts the removal of a cover and a padded layer on an inner surface of a cover from a side perspective in accordance with one aspect of this specification.

As shown in FIG. 5, drum set transportation apparatus 100 includes a padded insert 203 that may be configured to fit over kick drum 444 and between frame 201 and cover 102 and may be removable. Padded insert 203 may be comprised of a soft material which deforms temporarily under impact. As an example, padded insert 203 may be made of packing foam. In some embodiments, the packing foam may be made of polyethylene foam. In some embodiments, padded insert 203 may be excluded. As depicted in FIG. 5, padded insert 203 is shaped to conform to the curve of kick drum 444. In alternative embodiments, other packaging materials may be used.

As further shown in FIG. 5, cover 102 contains a padded layer 512 that is attached to an inner surface of cover 102. As an example, in embodiments where cover 102 has the shape of a hollow cuboid without a lower face, padded layer 512 is located on an underside of an upper face of cover 102. Padded layer 512 is made of a soft material which deforms temporarily under impact. As an example, padded layer 512 may be packing foam. In some embodiments, the packing foam may be made of polyethylene foam. In some embodiments, padded layer 512 has a thickness between 0.25 inches and 3 inches. In other embodiments (not shown) padded layer 512 may be omitted.

Figure 6:
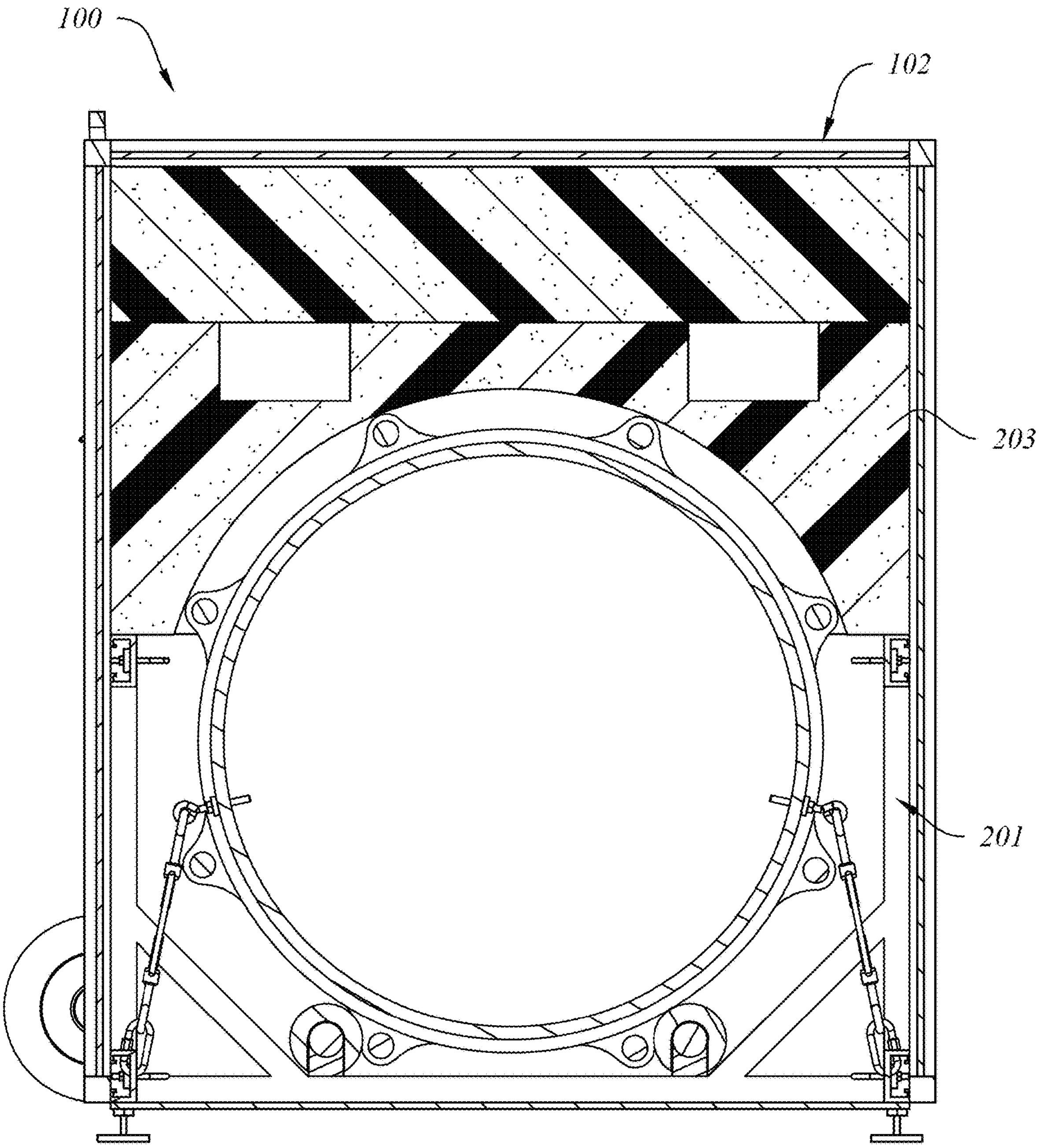
FIG. 6 illustrates an embodiment of a drum set transportation apparatus that depicts a cover placed upon a frame from a side perspective in accordance with one aspect of this specification.

As shown in FIG. 6, cover 102 may be configured to fit over and enclose frame 201 while at least one padded insert 203 rests on an upper surface of frame 201.

Figure 7:
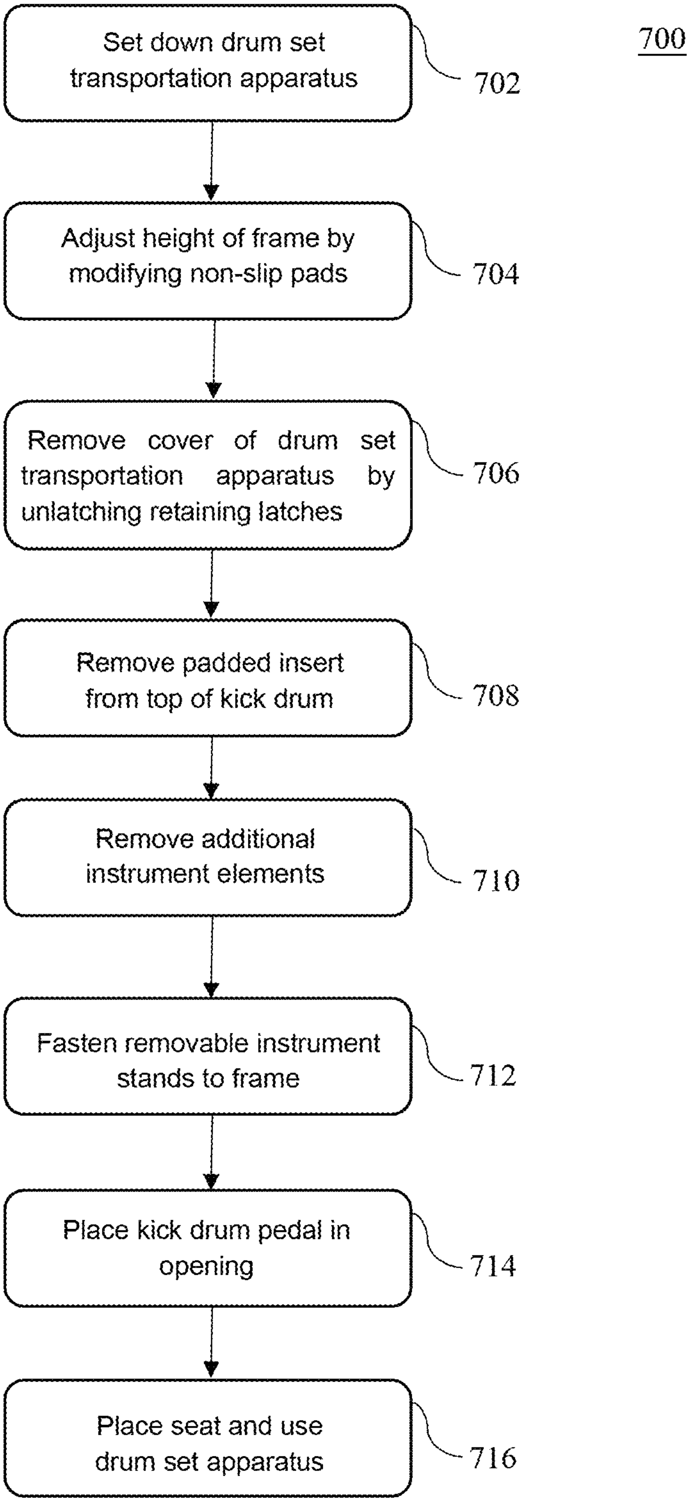
FIG. 7 illustrates a process for deploying a drum kit using the drum kit apparatus.

As further shown in FIG. 7, a method 700 for deploying a drum kit using the above-described drum kit apparatus is described. When a user arrives at a music venue, at step 702 a user begins assembly of a drum kit by setting down drum set transportation apparatus. At step 704, the user then may modify the height of the drum set transportation apparatus by adjusting the plurality of non-slip pads attached to the lower face of the frame. At step 706, the user may then remove the cover from the frame by unlatching the plurality of retaining latches disposed along the cover. At step 708, the user may remove the padded insert located on top of the kick drum. At step 710, the user may remove the additional instrument elements placed in the cavities in the upper surface of the removable padded insert. At step 712, the user may fasten the removable instrument stands to the longitudinally extending openings within the first base rail, second base rail, first top rail, and second top rail. At step 714, the user may place a kick drum pedal in the opening between the anterior members. At step 716, the user may then place a seat in front of and use the drum set apparatus. The order of these steps may be adjusted according to the user's preferences. A user may pack the drum kit for transportation by essentially practicing each of the above steps in reverse (e.g., removing kick drum and instrument stands, removing addition instrument elements, replacing padded insert, replacing cover, latching cover, adjusting feet, and transporting device to the next desired location). Although an order of steps is provided above, a user may perform various steps in any order as would be apparent to one of skill in the art.

References to specific materials such as fiberglass, aluminum, carbon fiber, and plastic, etc. in the embodiments described above should not be construed to exclude other possible materials which will be apparent to one of skill in the art.

It may be apparent to one of ordinary skill in the art that the drum set transportation apparatus may be created using some or all of the mentioned features and components without departing from the spirit and scope of the present invention.

The claimed invention is:

1. A drum set transportation apparatus comprising:

a frame comprising:

a base comprising a first base rail and a second base rail;

wherein the first and second base rails are connected by a horizontal base rail;

a first upright and second upright connected to the first base rail and a third upright and fourth upright connected to the second base rail;

a first top rail connected to the first upright and second upright;

a second top rail connected to the third upright and fourth upright;

a plurality of instrument stands removably attached to the frame;

a rectangular cuboid cover with an open face configured to overlay the frame;

wherein the rectangular cuboid cover comprises at least a solid top face opposite an open bottom face, a front face opposite a rear face, and a first lateral face opposite a second lateral face;

wherein the solid top face has a rear edge adjacent to the rear face and a retractable handle extending upward from the solid top face near the rear edge;

wherein the first lateral face has a bottom edge adjacent to the open bottom face and a rear edge adjacent to the rear face;

wherein the second lateral face has a bottom edge adjacent to the open bottom face and a rear edge adjacent to the rear face;

wherein a first wheel is mounted on the first lateral face near the bottom edge and rear edge of the first lateral face; and wherein a second wheel is mounted on the second lateral face near the bottom edge and rear edge of the second lateral face.

2. The apparatus of claim 1, wherein the first base rail is connected to a first anterior horizontal member and the second base rail is connected to a second anterior horizontal member.

3. The apparatus of claim 2, wherein the frame further comprises a solid bottom face connected to the first base rail on one edge and the second base rail at an opposite edge.

4. The apparatus of claim 3, wherein the first and second anterior horizontal members are disposed inline with each other and wherein a space separating the first and second anterior horizontal members is configured to fit a kick drum pedal.

5. The apparatus of claim 4, wherein each top rail further comprises at least one longitudinally extending opening configured to receive fasteners.

6. The apparatus of claim 5, wherein the first and second base rail further comprises at least one longitudinally extending opening configured to receive fasteners.

7. The apparatus of claim 6, the frame further comprising at least two turnbuckles affixed to the base rails to mount a kick drum to the frame.

8. The apparatus of claim 2, the frame further comprising a first cylindrical member with a first longitudinal and a second longitudinal end and a second cylindrical member with a first longitudinal and a second longitudinal end;

wherein the first cylindrical member is connected to the first anterior horizontal member at the first longitudinal end and the horizontal base rail at the second longitudinal end, the second cylindrical member is connected to the second anterior horizontal member at the first longitudinal end and the horizontal base rail at the second longitudinal end; and wherein the first and second cylindrical members are spaced to support a kick drum.

9. The apparatus of claim 6, wherein the plurality of instrument stands are removably attached to the first and second base rail and the first and second top rail by fasteners extending through the longitudinally extending openings in the top rails and base rails.

10. The apparatus of claim 9, wherein the plurality of instrument stands comprise:

a removable hollow post structure; and a vertical rod moveably disposed within the removable hollow post structure;

wherein the vertical rod is configured to extend out of the removable hollow post structure; and wherein the vertical rod is configured to receive a plurality of additional instrument elements.

11. The apparatus of claim 10, wherein the apparatus further comprises a removable padded insert configured to fit inside the rectangular cuboid cover and shaped to secure an instrument.

12. The apparatus of claim 11, wherein the removable padded insert further comprises at least one cavity in an upper surface to contain one or more pieces of equipment.

13. The apparatus of claim 10, wherein the cover further comprises a padded layer on an upper interior surface.

14. The apparatus of claim 3, wherein the frame further comprises a plurality of non-slip pads located on the solid bottom face.

15. The apparatus of claim 14, wherein the plurality of non-slip pads are attached to the solid bottom face by a plurality of adjustable mounts configured to allow the non-slip pads to be disposed at varying distances from the solid bottom face.

16. An instrument transportation apparatus, comprising:

a rectangular cuboid frame comprising;

a set of top rails and a set of bottom rails;

wherein the top rails and the bottom rails are connected by uprights;

wherein the bottom rails are connected by a connecting horizontal rail; and wherein the rectangular frame is configured to receive an article;

a cover configured to fit around the frame, the cover comprising a top face, a plurality of lateral faces, a front face, a rear face, an open bottom face, a set of wheels disposed in along opposite edges of the bottom face and near a rear edge of the bottom face, wherein the rear edge of the bottom face is adjacent to the rear face of the cover, and a retractable handle on the top face;

wherein the retractable handle is disposed above the set of wheels and near a rear edge of the top face of the cover, wherein the retractable handle extends upward from the top face of the cover, and wherein the rear edge of the top face is adjacent to the rear face; and a plurality of accessory connection poles;

wherein the accessory connection poles are configured to attach to the rectangular frame; and wherein the accessory connection poles are configured to attach to a set of secondary articles.

17. The apparatus of claim 16, further comprising at least two turnbuckles;

wherein the turnbuckles are configured to attach to the rectangular frame;

wherein turnbuckles are configured to secure the article received by the rectangular frame.

18. The apparatus of claim 16, wherein the set of bottom rails comprises a first bottom rail and a second bottom rail, and wherein the first bottom rail is connected to a first anterior horizontal member and the second bottom rail is connected to a second anterior horizontal member.

19. The apparatus of claim 18, the frame further comprising a first cylindrical member with a first longitudinal and a second longitudinal end and a second cylindrical member with a first longitudinal and a second longitudinal end;

wherein the first cylindrical member is connected to the first anterior horizontal member at the first longitudinal end and the connecting horizontal rail at the second longitudinal end, the second cylindrical member is connected to the second anterior horizontal member at the first longitudinal end and the connecting horizontal rail at the second longitudinal end; and wherein the first and second cylindrical members are spaced to support a kick drum.

20. A method for deploying a drum set using a drum set transportation apparatus, comprising:

setting down the drum set transportation apparatus at a desired location, the drum set apparatus further comprising:

a frame with a plurality of non-slip pads attached to a lower face of the frame;

a cover overlaying the frame, the cover having a plurality of engaged retaining latches;

a kick drum attached to the frame; and a removable padded insert located on top of the kick drum within the frame;

a plurality of additional instrument elements, wherein the frame further comprises a first base rail, a second base rail, a first top rail, and a second top rail;

modifying a height of the drum set transportation apparatus by adjusting the plurality of non-slip pads attached to a lower face of the frame;

removing the cover from the frame by unlatching the plurality of retaining latches disposed along the cover and lifting the cover;

removing the padded insert located on top of the kick drum within the frame;

removing the plurality of additional instrument elements placed in cavities in an upper surface of the removable padded insert;

fastening a plurality of removable instrument stands to at least one of a set of longitudinally extending openings within the first base rail, the second base rail, the first top rail, and the second top rail of the frame; and placing a kick drum pedal in an opening between a pair of anterior members of the frame.

* * * * *